(12) United States Patent
Lin

(10) Patent No.: US 6,932,692 B1
(45) Date of Patent: Aug. 23, 2005

(54) FILM VALVE FOR AN AIR CONDITIONING SYSTEM

(75) Inventor: Paul Lin, Yung-Kang (TW)

(73) Assignee: Macauto Industrial Co., Ltd., Yung-Kang (TW)

( * ) Notice: Subject to any disclaimer, the term of this patent is extended or adjusted under 35 U.S.C. 154(b) by 0 days.

(21) Appl. No.: 10/916,485

(22) Filed: Aug. 12, 2004

Related U.S. Application Data

(63) Continuation-in-part of application No. 10/855,700, filed on May 28, 2004.

(51) Int. Cl.$^7$ ............................................. B60H 1/00
(52) U.S. Cl. ..................... 454/69; 251/901; 454/121; 454/156
(58) Field of Search .................... 454/69, 121, 156, 454/159, 160, 161; 251/901

(56) References Cited

U.S. PATENT DOCUMENTS

| 5,160,115 A | 11/1992 | Ito et al. |
| 6,508,703 B1 * | 1/2003 | Uemura et al. ............. 454/156 |
| 6,616,660 B1 | 9/2003 | Platt |

* cited by examiner

*Primary Examiner*—Harold Joyce
(74) *Attorney, Agent, or Firm*—Lowe, Hauptman & Berner, LLP

(57) ABSTRACT

A film valve for an air conditioning system is of the type having two spaced-apart coupling ends, and a plurality of vent holes disposed between the coupling ends. The film valve includes a base layer made of glass fiber and having two opposite side surfaces, and two wear-resistant coating layers applied respectively to the side surfaces of the base layer. Each of the coating layers is made of a material that is selected from the group consisting of silicon, polyurethane, and Teflon.

7 Claims, 2 Drawing Sheets

FILM VALVE FOR AN AIR CONDITIONING SYSTEM

CROSS-REFERENCE TO RELATED APPLICATION

This application is a continuation-in-part (CIP) of co-pending U.S. patent application Ser. No. 10/855,700, filed by the applicant on May 28, 2004, the entire disclosure of which is hereby incorporated by reference.

BACKGROUND OF THE INVENTION

1. Field of the Invention

This invention relates to a film valve, more particularly to a film valve for an air conditioning system, which can be moved to adjust the positions of air outlets and the air flow.

2. Description of the Related Art

U.S. Pat. No. 6,616,660 discloses a heating, ventilation, and air conditioning system, which includes a film valve that has two coupling ends coupled respectively to two rollers, and a plurality of vent holes formed therethrough. The film valve can be moved to change the positions of the vent holes so as to adjust the positions of air outlets and the air flow. Because the film valve is made typically of a single plastic material, such as polyethylene resin, as taught in U.S. Pat. No. 5,160,115, it is easy to break along the walls defining the vent holes. Moreover, because the film valve is wound around and is unwound from the rollers to move on a base wall and because the strength of the polyethylene resin is relatively weak, wear occurs on two opposite side surfaces of the film valve, thereby reducing the service life of the film valve. Further, when the film valve is used within a high-temperature environment, such as a car, it is easy to decline.

SUMMARY OF THE INVENTION

The object of this invention is to provide a durable film valve for an air conditioning system.

According to this invention, a film valve for an air conditioning system is of the type having two spaced-apart coupling ends, and a plurality of vent holes disposed between the coupling ends. The film valve includes a base layer made of glass fiber and having two opposite side surfaces, and two wear-resistant coating layers applied respectively to the side surfaces of the base layer. Each of the coating layers is made of a material that is selected from the group consisting of silicon, polyurethane, and Teflon.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
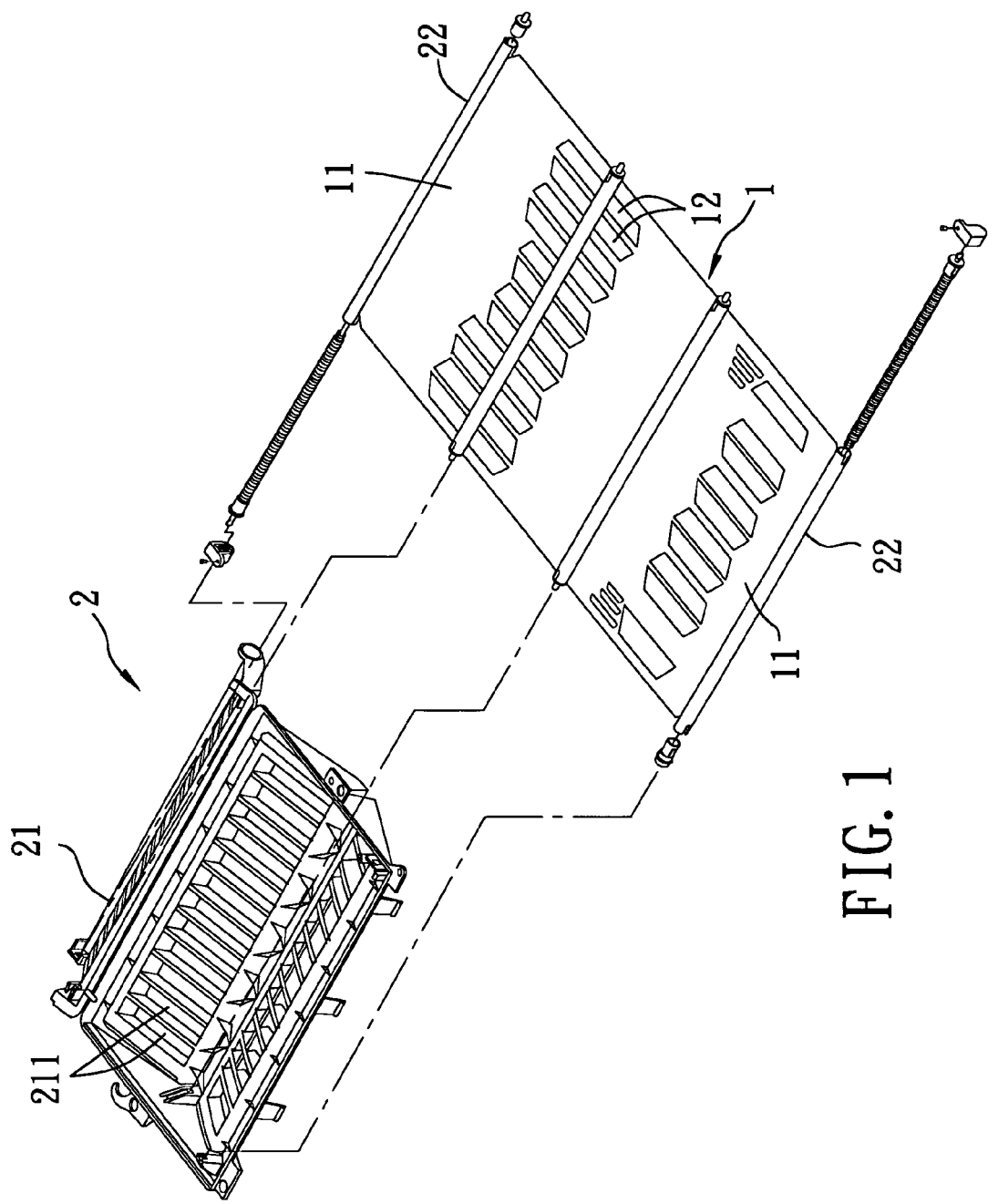
FIG. 1 is a schematic view illustrating an air conditioning system that incorporates the preferred embodiment of a film valve according to this invention.
Figure 2:
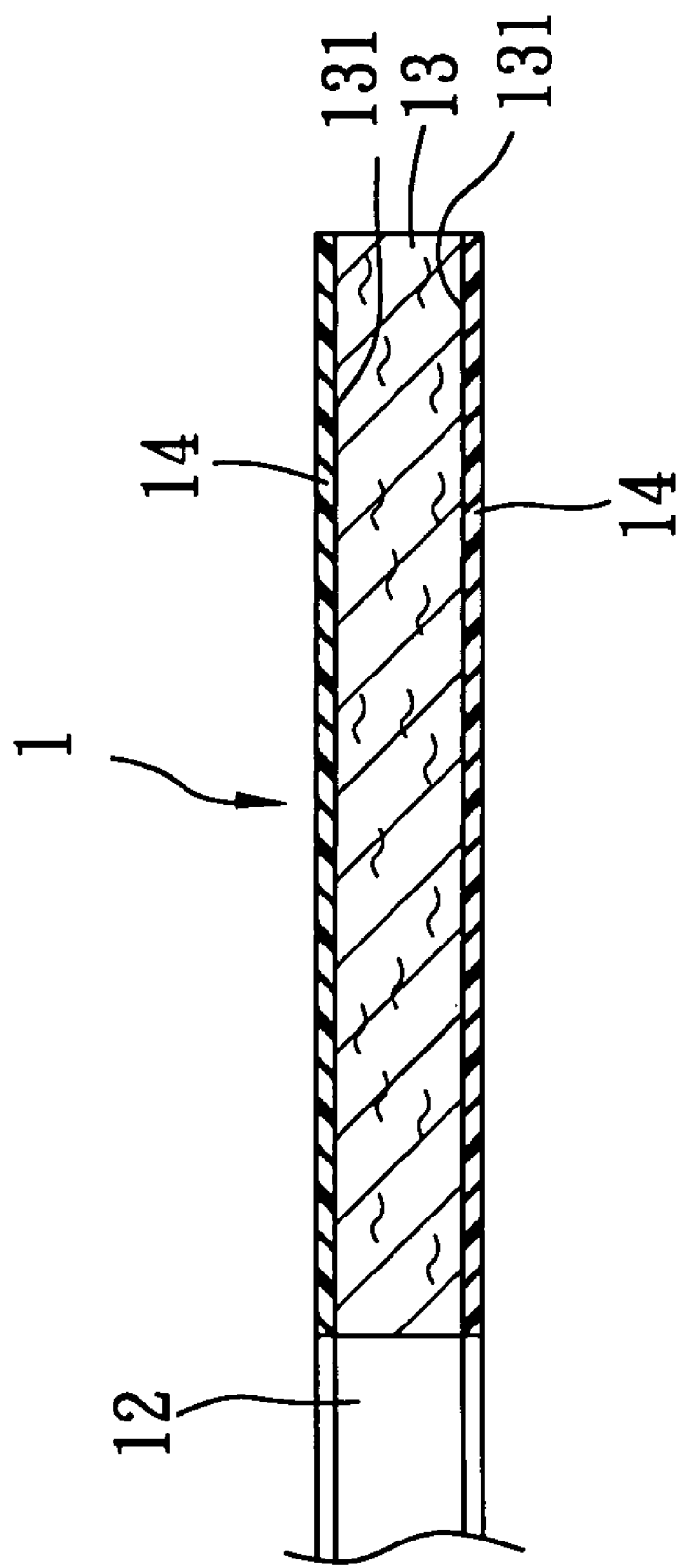
FIG. 2 is a fragmentary sectional view of the preferred embodiment.

Referring to FIGS. 1 and 2, the preferred embodiment of a film valve 1 is incorporated in an air conditioning system 2, which includes a base wall 21 and two spaced-apart rollers 22 disposed on the base wall 21. The film valve 1 is connected to the rollers 22 under tension. The rollers 22 are rotatable to wind the film valve 1 around one of the rollers 22 and unwind the film valve 1 from the other of the rollers 22 so as to move the film valve 1 on the base wall 21.

The film valve 1 is configured as a flexible film, and has two spaced-apart coupling ends 11 coupled respectively to the rollers 22 in a known manner, and a plurality of vent holes 12 disposed between the coupling ends 11. To enhance the durability and wear-resisting ability, the film valve 1 includes a base layer 13 made of glass fiber and having two opposite side surfaces 131, and two wear-resistant coating layers 14 applied respectively to the side surfaces 131 of the base layer 13. Each of the wear-resistant coating layers 14 is made of a material that is selected from the group consisting of silicon, polyurethane, and Teflon. Therefore, the material of the film valve 1 has the following examples:

(1) The coating layers 14 are made of silicon.
(2) The coating layers 14 are made of polyurethane.
(3) The coating layers 14 are made of Teflon.
(4) One of the coating layers 14 is made of silicon. The other of the coating layers 14 is made of polyurethane.
(5) One of the coating layers 14 is made of polyurethane. The other of said coating layers 14 is made of Teflon.

Because glass fiber has high strength, breakage of the film valve 1 along the peripheries of the vent holes 12 can be prevented. Furthermore, because glass fiber is a high temperature-resistant material, the film valve 1 is suitable for use in a car.

With this invention thus explained, it is apparent that numerous modifications and variations can be made without departing the scope and spirit of this invention. It is therefore intended that this invention be limited only as indicated by the appended claims.

I claim:

1. A film valve for an air conditioning system, said film valve being of the type having two spaced-apart coupling ends, and a plurality of vent holes disposed between said coupling ends, said film valve comprising:
   a base layer made of glass fiber and having two opposite side surfaces; and
   two wear-resistant coating layers applied respectively to said side surfaces of said base layer, each of said coating layers being made of a material that is selected from the group consisting of silicon, polyurethane, and Teflon.

2. The film valve as claimed in claim 1, wherein said coating layers are made of silicon.

3. The film valve as claimed in claim 1, wherein said coating layers are made of polyurethane.

4. The film valve as claimed in claim 1, wherein said coating layers are made of Teflon.

5. The film valve as claimed in claim 1, wherein said coating layers are made of different materials.

6. The film valve as claimed in claim 5, wherein one of said coating layers is made of silicon, and the other of said coating layers is made of polyurethane.

7. The film valve as claimed in claim 5, wherein one of said coating layers is made of polyurethane, and the other of said coating layers is made of Teflon.

* * * * *